July 14, 1953 F. J. BOSLEY 2,645,377
BRUSH WIPER
Filed June 14, 1948
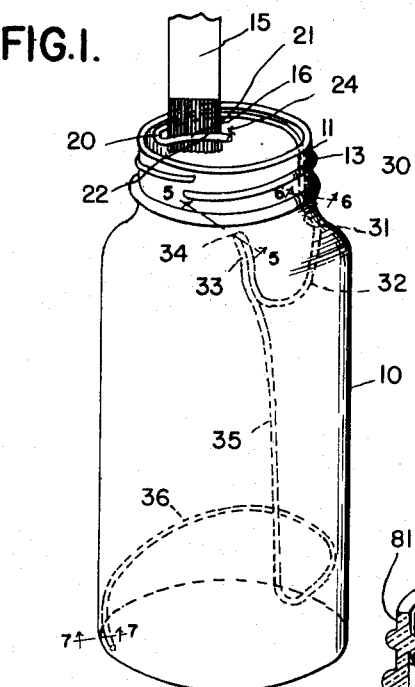
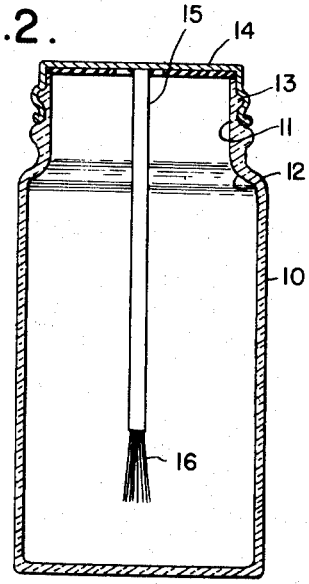
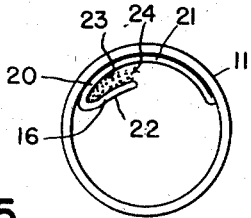
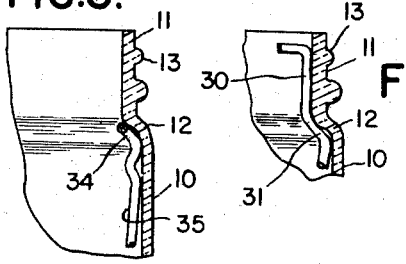
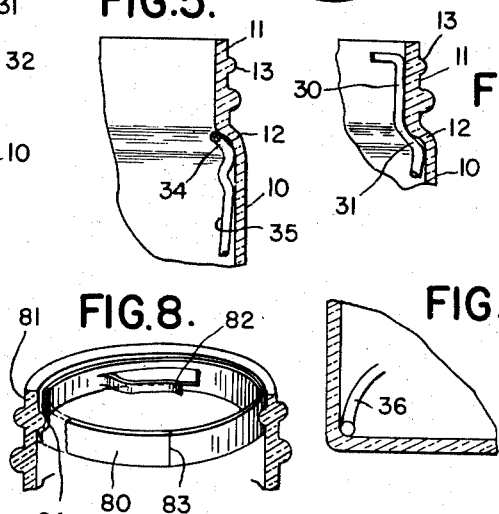
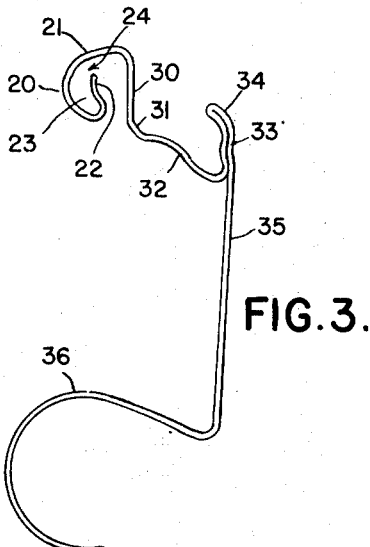
INVENTOR.
FRANK J. BOSLEY
BY
Whittemore, Hulbert
& Belknap ATTORNEYS

Patented July 14, 1953

2,645,377

UNITED STATES PATENT OFFICE 2,645,377

BRUSH WIPER

Frank J. Bosley, Detroit, Mich.

Application June 14, 1948, Serial No. 32,741

7 Claims. (Cl. 220—90)

The present invention relates to a brush wiper and more particularly to a brush wiper to be applied to an open topped jar or the like which carries an adhesive material such as mucilage or rubber cement.

It is an object of the present invention to provide a brush wiper characterized by the economy with which it may be produced, the simplicity with which it may be applied to the jar, and its efficiency in operation.

More specifically, it is an object of the present invention to provide a brush wiper comprising a generally U-shaped or hook shaped wiper portion disposed to extend along an inner surface of the neck of the jar and having an opening into the elongated space thus provided which faces generally tangentially of the jar opening so that the brush may be introduced into the opening by moving it around the neck of the jar until it is guided into the opening into the wiper portion.

It is a further object of the present invention to provide a jar for containing adhesive, in combination with a cap having an applicator brush depending from the central portion thereof, and brush wiper means located in the neck of the jar and disposed entirely to one side of the central portion thereof so as to prevent interference with the brush during normal application and removal of the cap thereto and therefrom.

More specifically, it is an object of the present invention to provide a brush wiper structure which may be readily applied to an open topped jar and which when in a position therein is retained with a high degree of stability.

It is a feature of the present invention to provide a brush wiper formed of an elongated resilient member having one end portion reversely bent into a hook shape to provide a wiper portion, the second portion shaped to engage cooperating surfaces on the interior of the jar, the opposite end portion being shaped to extend downwardly and engage the bottom of the jar.

It is a further feature of the present invention to provide a brush wiper construction for an open topped jar having a reduced neck which provides downwardly facing shoulder portions at the interior thereof, the wiper structure comprising a resilient wire having one end portion reversely bent into hook shape to provide a wiper portion, an intermediate portion shaped to fit under the shoulder of the jar, the portion of the structure intermediate the hook portion and the intermediate portion being stressed so as to provide lateral forces causing the hook portion and the intermediate portion to be in pressure contact with the jar, having a downwardly extending portion engageable with the bottom of the jar, the downwardly extending portion being stressed so as to provide generally vertical forces causing the downwardly extending portion and intermediate portion to be in pressure contact with the bottom of the jar and the downwardly facing shoulders thereof respectively.

Other objects and features of the invention will become apparent as the description proceeds, especially when taken in conjunction with the accompanying drawings, wherein:

Figure 1 is a perspective view showing the brush wiper in a jar and illustrating its cooperation with a brush.

Figure 2 is a vertical section through a jar and its top illustrating the location of the applicator brush with respect thereto.

Figure 3 is a perspective view of one form of brush wiper structure.

Figure 4 is a plan view of the top of the jar showing the location of the brush wiper portion with respect thereto.

Figure 5 is a fragmentary section on the line 5—5 of Figure 1.

Figure 6 is a fragmentary section on the line 6—6 of Figure 1.

Figure 7 is a fragmentary section on the line 7—7 of Figure 1.

Figure 8 is a perspective view of a different embodiment of the invention.

Referring now to the drawings, the present invention is designed for cooperation with a jar of the type illustrated in Figure 2. As seen in this figure the jar 10 which may conveniently be formed of glass or the like is provided with a reduced neck 11 providing a downwardly and inwardly facing shoulder 12 at the interior of the jar. The outer portion of the neck 11 is threaded as indicated at 13 and is provided with a cap or closure 14 which conveniently may be formed of metal. Rigidly secured to the underside of the cap 14 and located substantially at the center thereof is an applicator brush 15 having bristles 16 at the lower end thereof.

Containers of the type illustrated have the disadvantage that when the cap is removed and the brush drawn upwardly out of the adhesive material contained therein a considerable excess of the relatively sticky and viscous adhesive material remains on the brush and on the handle portion thereof. Considerable time may be lost in attempting to wipe the brush against the lip of the jar and this operation also usually results in some of the adhesive material being displaced to the outside of the jar where it may cause the cap or closure member to stick to the jar or it may even flow down over the outside surfaces of the jar. Moreover, the adhesive materials often times are relatively fast setting and it is desirable to apply the adhesive where desired as soon as the brush is removed from the jair. Finally the time consumed in wiping the excess adhesive material from the brush is not only lost time but also represents additional time during which the cap or closure member is off the jar, thus tending to cause the material in the jar to set. As best seen in Figure 4 the present invention provides a generally U-shaped or hook shaped wiper portion 20. The wiper portion 20 comprises a first portion 21 which is bent to lie along an inner surface of the neck 11 of the jar and a reversely bent portion 22. The portions 21 and 22 define therebetween an elongated space indicated at 23 which is open at one end as indicated at 24, the open end 24 facing generally tangentially of the neck. In this figure the bristle portion 16 of the brush is indicated as located in the space 23. It will be appreciated that the arrangement of the wiper portion as illustrated in Figure 4 facilitates the introduction of the brush into the wiper portion. The user merely moves the handle portion of the brush into contact with the side wall of the neck 11 and thereafter moves the brush around the neck so as to cause it to pass into the opening 24. Moreover, the location of the wiper portion 20 as illustrated in Figure 4 is further highly advantageous when employed with a brush cap combination of the type disclosed in Figure 2, since it leaves the entire central portion of the neck 11 clear and thus prevents interference with the brush 15 during application of the cap 14 to the jar 10.

As thus far described, the wiper portion 20 represents a highly useful device entirely independent of the method of supporting the wiper portion in the jar. Thus for example, the wiper portion as illustrated in Figure 4 could if desired be formed into the glass which constitutes the neck of the jar, or it could be a completely annular member secured in the neck of the jar by a suitable cement or the like. However, the present invention further includes a specific structure for supporting the wiper portion 20 in a simple and effective manner.

As illustrated in the remaining figures the brush wiper is preferably formed of an elongated member which may conveniently take the form of a resilient wire. This wire is bent or shaped to the desired form and is intended to be mounted in the jar simply by the act of inserting it therein, and is designed to have considerable stability when thus mounted in the jar. For this purpose the wire is provided with a downwardly extending portion 30 adjacent the wiper portion 20, the portion 30 being shaped to extend along the inner surface of the neck 11 as best illustrated in Figure 6. Immediately below the extending portion 30 is an inclined abutment portion 31 which is adapted to engage under the shoulder 12 of the jar as illustrated in Figure 6. Next adjacent to the abutment portion 31 is a generally transversely extending portion 32 which connects to an upwardly extending portion 33, the upper portion of which is inwardly bent to provide a second inclined abutment portion 34. The abutment portion 34 as best illustrated in Figure 5 also engages under the shoulder 12 of the jar at a point spaced a substantial angular distance from the point of engagement of the abutment portion 31. Next adjacent to the upwardly extending portion 33 is a downwardly extending portion 35 which is adapted to lie along the interior surface of the jar and which terminates in a curved portion 36 adapted to engage the bottom of the jar as best illustrated in Figure 7. It will be understood that the curved portion 36 may engage the bottom of the jar at its extreme end or it may be so shaped as to engage the bottom of the jar at a point somewhat spaced from the end thereof.

The stability of the structure in the jar is dependent upon shaping the brush wiper element so that it is stressed when it is inserted into the jar. Thus the portions 35 and 36 of the brush wiper are stressed so as to cause the portion 36 to engage in pressure contact with the bottom and side of the jar and the abutment portion 34 to engage in pressure contact against the underside of the shoulder 12. The wiper portion 20 of the brush wiper is in pressure contact with the interior surface of the neck of the jar and the abutment portion 31 is in contact with the under surface of the shoulder 12.

Preferably the wiper portion 20 is colored so that it becomes readily visible when the cap 14 is removed. Excellent results have been obtained by the simple expedient of dipping the wiper portion in white paint prior to the insertion of the structure into the jar.

The wire structure illustrated in Figure 3 can be produced at a purely nominal cost and may be applied to the jar by the simple expedient of pressing it into the open neck. This act stresses the portions of the structure so as to cause the assembly to be in pressure contact with the jar. It is found that it is retained firmly therein and has a high degree of stability, resisting both withdrawal from the jar and turning movement relative to the jar.

As best seen in Figure 8, the brush wiper may be formed from a band 80 bent to be received within the neck of a container or jar 81. The band conveniently may be of metal and adhered or otherwise bonded to the inner surface of the neck. A relatively narrow tongue 82 is struck out of the material of the band, and is arcuately curved to define a relatively narrow arcuate wiping slot extending along the inner edge of the container neck. Since the tongue as illustrated is spaced both from the ends 83 and the edges of the band, use of the wiper does not tend to destroy the bond to the container neck.

If desired the band may be formed of resilient metal tending to expand into pressure contact with the inner surface of the neck, and in such case it is further contemplated that the neck and band may have a mechanical interlock, for example, dimples projecting inwardly from the neck and seating in recesses in the band, as indicated at 84. However, excellent results have been obtained when the band is merely adhered to the neck of the container. Thus it is contemplated that simple adhesion or mechanical interlocking of a resilient band, or both may be employed in securing the brush wiper in place.

The drawings and the foregoing specification constitute a description of the improved brush wiper in such full, clear, concise and exact terms as to enable any person skilled in the art to practice the invention, the scope of which is indicated by the appended claims.

What I claim as my invention is:

1. In combination, a jar having a reduced neck providing downwardly facing shoulders at the interior of the jar, a brush wiper formed from a single elongated element comprising a reversely bent hook portion located within the neck of the jar and extending along a side surface of said neck, an inclined abutment portion adjacent said hook portion engaged under said shoulder, a second inclined abutment portion engaged under said shoulder and spaced substantially from said first mentioned abutment, and a downwardly extending portion engaging the bottom of said jar.

2. In combination, a jar having a reduced neck providing downwardly facing shoulders at the interior of the jar, a brush wiper comprising a reversely bent hook portion located within the neck of the jar and extending along a side surface of said neck, an inclined abutment portion angularly spaced from said hook portion engaged under said shoulder, a second inclined abutment portion engaged under said shoulder and angularly spaced substantially from said first mentioned abutment, and a downwardly extending portion engaging the bottom of said jar, said wiper being formed of resilient material, the dimensions of the portions thereof intermediate said hook portion and abutment portions, and between said abutment portions and the portion engaging the bottom of the jar being greater than the spacing between the jar elements which they engage to stabilize said structure in said jar.

3. In combination, a jar having a reduced neck providing downwardly facing shoulders at the interior of the jar, a brush wiper formed of a single piece of resilient wire comprising sequentially a reversely bent hook portion at one end of the wire, located within the neck of the jar and extending along a side surface of said neck, an inclined abutment portion angularly spaced from said hook portion engaged under said shoulder, a second inclined abutment portion engaged under said shoulder and angularly spaced substantially from said first mentioned abutment, and a downwardly extending portion terminating in a curved arm fitting against the side of the jar and having an end extending downwardly to an extent requiring upward flexure thereof to insert the structure within the jar.

4. In combination, a jar having a reduced neck portion providing downwardly facing shoulders at the interior of the jar, a brush wiper formed of a single piece of wire having at one end thereof a reversely bent arcuately shaped hook portion one leg of which is curved to lie along the inner surface of the neck, the other leg being generally parallel to the first leg and disposed inwardly of the neck of the jar from the first leg, a first abutment portion angularly spaced from the hook portion around the neck of the jar and shaped to engage below said shoulder, a second abutment angularly spaced from said first abutment and also shaped to engage below said shoulder, said first and second abutments together being disposed generally across the neck of the jar from the hook shaped portion to support and stabilize the hook shaped portion within the neck of the jar, said wire having a portion extending downwardly from the second abutment to a point adjacent the bottom of the jar and having a laterally curved end portion shaped to fit against the inner surface of the jar, the free end thereof extending downwardly to a point requiring upward bending thereof in order to insert the said abutment portions under the shoulder, whereby to bias the brush wiper upwardly to cause firm guiding engagement between the said abutments and the said shoulder.

5. In combination, a jar having a reduced neck providing downwardly facing shoulders at the interior of the jar, a brush wiper comprising a single resilient wire element having one end reversely bent to form a hook located within the neck of the jar with the closed end of the hook in pressure contact with the interior surface of the neck, said wire element having a pair of inclined abutment portions circumferentially spaced from said hook and from each other and engaged under said shoulder, the opposite end of said wire extending downwardly and including a laterally bent portion spaced below said abutment portions a distance greater than the height of said jar from the bottom wall to the shoulder thereof to require flexing of said laterally bent portions to insert said abutment portions under said shoulder, said laterally bent portion being shaped to fit against the inner side surface of said jar.

6. Structure as defined in claim 5 in which one of said abutment portions is located generally across the neck of said jar from said hook, and said other abutment portion is intermediate said first abutment portion and hook.

7. A new article of manufacture for use with a jar having a reduced neck providing an annular downwardly facing shoulder at the interior of the jar, a brush wiper member adapted to be inserted in the jar as a unit and retained in operative position therein, said brush wiper comprising a single resilient wire element having one end reversely bent to form a hook, the intermediate portion of said wire element having upwardly facing abutment portions located below said hook and angularly displaced from said hook and from each other, the other end portion of said wire extending downwardly and terminating in a laterally extending arm, said hook being adapted to be received in the neck of the jar and to engage the inner surface thereof, said abutment portions being engageable under the shoulder of the jar to retain the brush wiper from coming out of the jar, and said laterally extending arm being shaped to fit the interior surface of the jar and to engage the bottom surface of the jar, the end of said arm being spaced from said abutment portions a distance greater than the distance between the bottom of the jar and its shoulders to require flexing of said arm when said abutment portions are inserted below the shoulders of the jar.

FRANK J. BOSLEY.

References Cited in the file of this patent

UNITED STATES PATENTS

| Number | Name | Date |
| --- | --- | --- |
| 150,986 | Swift | May 19, 1874 |
| 433,090 | Phelps | July 29, 1890 |
| 448,492 | Aikens | Mar. 17, 1891 |
| 571,438 | Harlow | Nov. 17, 1896 |
| 2,009,899 | Nagl | July 30, 1935 |
| 2,096,975 | Revson | Oct. 26, 1937 |
| 2,273,495 | Nelson | Feb. 17, 1942 |
| 2,342,454 | Coyliondro | Feb. 22, 1944 |